(12) United States Patent
Zanzig et al.

(10) Patent No.: US 7,604,031 B2
(45) Date of Patent: Oct. 20, 2009

(54) PNEUMATIC TIRE

(75) Inventors: David John Zanzig, Uniontown, OH (US); Uwe Ernest Frank, Wendel (DE); Georges Marcel Victor Thielen, Grand Duchy (LU); Manfred Josef Jung, Freisen (DE)

(73) Assignee: The Goodyear Tire & Rubber Company, Akron, OH (US)

( * ) Notice: Subject to any disclaimer, the term of this patent is extended or adjusted under 35 U.S.C. 154(b) by 15 days.

(21) Appl. No.: 11/952,391

(22) Filed: Dec. 7, 2007

(65) Prior Publication Data

US 2008/0149248 A1 Jun. 26, 2008

Related U.S. Application Data

(63) Continuation of application No. 11/643,162, filed on Dec. 21, 2006, now abandoned.

(51) Int. Cl.
| | |
|---|---|
| *B60C 5/00* | (2006.01) |
| *B60C 9/00* | (2006.01) |
| *B60C 9/12* | (2006.01) |
| *B60C 1/00* | (2006.01) |
| *C08K 3/34* | (2006.01) |
| *C08K 3/04* | (2006.01) |

(52) U.S. Cl. .................. 152/450; 152/458; 524/492; 524/493; 524/495

(58) Field of Classification Search ............... 524/493, 524/492, 495; 152/450, 458
See application file for complete search history.

(56) References Cited

U.S. PATENT DOCUMENTS

| | | | |
|---|---|---|---|
| 4,898,223 A | 2/1990 | Botzman et al. | 152/547 |
| 5,395,891 A | 3/1995 | Obrecht et al. | 525/194 |
| 5,430,084 A | 7/1995 | Sandstrom et al. | 524/492 |
| 5,707,462 A * | 1/1998 | Kikuchi et al. | 152/209.1 |
| 6,127,488 A | 10/2000 | Obrecht et al. | 525/333.3 |
| 6,133,364 A | 10/2000 | Obrecht et al. | 524/495 |
| 6,184,296 B1 | 2/2001 | Obrecht et al. | 525/232 |
| 6,207,757 B1 | 3/2001 | Obrecht et al. | 525/194 |
| 6,242,534 B1 | 6/2001 | Obrecht et al. | 525/191 |
| 6,372,857 B1 | 4/2002 | Obrecht et al. | 525/332.6 |
| 6,608,125 B2 | 8/2003 | Cruse et al. | 524/262 |
| 6,761,198 B2 | 7/2004 | Zanzig et al. | 152/209.5 |
| 6,848,487 B2 | 2/2005 | Weydert et al. | 152/525 |
| 2001/0020505 A1 * | 9/2001 | Zanzig et al. | 152/209.12 |
| 2002/0049282 A1 | 4/2002 | Obrecht et al. | 525/194 |
| 2002/0170642 A1 * | 11/2002 | Westermann et al. | 152/209.5 |
| 2003/0092827 A1 * | 5/2003 | Obrecht et al. | 524/525 |
| 2006/0060284 A1 | 3/2006 | Zanzig et al. | 152/525 |

* cited by examiner

*Primary Examiner*—Mark Eashoo
*Assistant Examiner*—Angela C Scott
(74) *Attorney, Agent, or Firm*—John D. DeLong

(57) ABSTRACT

A pneumatic tire having a rubber sidewall including (A) 30 to 80 phr of natural rubber;
(B) 20 to 70 phr of cis 1,4-polybutadiene rubber;
(C) from 10 to 100 phr of silica; and
(D) from 1 to 30 phr of a particulate rubber gel filler selected from the group consisting of polybutadiene gel, styrene butadiene gel, acrylonitrile-butadiene gel, chloroprene gel, natural rubber gel, and mixtures thereof.

13 Claims, No Drawings

PNEUMATIC TIRE

This is a continuation of application Ser. No. 11/643,162, filed on Dec. 21, 2006, now abandonded.

BACKGROUND OF THE INVENTION

Pneumatic rubber tires are conventionally composed of a toroidal carcass with a circumferential tread and adjoining sidewalls.

The tread is conventionally designed to be ground-contacting and thereby is of a suitable rubber composition for such purpose and also is of a suitable configuration. For example, such a tread may have properties which emphasize good traction and resistance to treadwear. Such tires may have a tread of a lug and groove configuration which is designed to be ground-contacting.

In contrast, the associated sidewalls are conventionally not designed to be ground contacting and, in order to be appropriately supportive of the tread, are conventionally composed of a rubber composition which is not designed for traction and resistance to treadwear but, instead, of a rubber composition which is of low hysteresis to provide low heat buildup and is softer to provide greater flexibility than that of the tread rubber.

As a result, such softer sidewall rubber compositions typically have less resistance to puncturing objects, abrasion and to scuffing against road curbs or other objects.

However, some tires are desired to be utilized under more harsh conditions such as, for example, rough roads or off-the-road service or on specialty vehicles which may be designed to run on low inflation tires where the tire sidewall may come in contact with the ground. Such circumstances may occur, for example, in various mine operations and in logging operations, or where the tire is run over rough terrain at low inflation pressures. Under such conditions, growth of a crack, or cut, in the sidewall and, also, resistance to puncture, are significant considerations.

A significant need for a sidewall rubber composition for such use is a hybrid rubber composition which with suitable resistance to puncture and abrasion typically associated with tread rubber compositions while substantially maintaining flex fatigue and hysteretic properties typically associated with sidewall rubber compositions.

SUMMARY OF THE INVENTION

The present invention is directed to a pneumatic tire having a rubber sidewall comprised of (A) 30 to 80 phr of natural rubber;
(B) 20 to 70 phr of cis 1,4-polybutadiene rubber;
(C) from 10 to 100 phr of silica; and
(D) from 1 to 30 phr of a particulate rubber gel filler selected from the group consisting of polybutadiene gel, styrene butadiene gel, acrylonitrile-butadiene gel, chloroprene gel, natural rubber gel, and mixtures thereof.

DETAILED DESCRIPTION OF THE INVENTION

There is disclosed a pneumatic tire having a rubber sidewall comprised of (A) 30 to 80 phr of natural rubber;
(B) 20 to 70 phr of cis 1,4-polybutadiene rubber;
(C) from 10 to 100 phr of silica; and
(D) from 1 to 30 phr of a particulate rubber gel filler selected from the group consisting of polybutadiene gel, styrene butadiene gel, acrylonitrile-butadiene gel, chloroprene gel, natural rubber gel, and mixtures thereof.

In one embodiment, the rubber sidewall comprises from 1 to 30 phr of a rubber gel. In another embodiment, the rubber sidewall comprise from 5 to 20 phr of a rubber gel. The term "rubber gel" or "particulate rubber gel filler" is used herein to describe polybutadiene gel, styrene butadiene gel, acrylonitrile-butadiene gel, chloroprene gel and natural rubber gel. The preferred gels are polybutadiene gel and styrene butadiene gel. Suitable gels are described in and may be produced by methods as are taught in U.S. Pat. Nos. 5,395,891; 6,127,488; 6,184,296; 6,242,534; 6,207,757; 6,372,857; and 6,133,364.

Representative styrene butadiene gels which may be used for use in the present invention are described in U.S. Pat. No. 6,127,488 which is incorporated by reference in its entirety.

The rubber gels also include such polymeric copolymers grafted with polar unsaturated monomers such as acrylic acid, methacrylic acid, acrylamide, methacrylamide, N-methoxymethyl methacrylic acid amide, N-methoxymethyl methacrylic acid amide, N-acetoxymethyl methacrylic acid amide, acrylonitrile, dimethyl acrylamide, hydroxyethyl acrylate, hydroxyethyl methacrylate, hydroxypropyl acrylate, hydroxypropyl methacrylate, hydroxybutyl acrylate, hydroxybutyl methacrylate and mixtures thereof. The grafted rubber gel may have from 1 to 20 weight percent of its makeup derived from the polar monomers.

The rubber gels have particle diameters of from 20 to 1000, preferably 30 to 400 nm (DVN value to DIN 53 206) and swelling indices ($Q_i$) in toluene of from 1 to 15, preferably 1 to 10. The swelling index is calculated from the weight of the gel when it contains solvent (following centrifuging at 20,000 rpm) and its weight when dry:

$Q_i$=wet weight of gel/dry weight of gel

As an example of determining the swelling index, 250 mg of SBR gel is swelled in 25 ml toluene for 24 hours, with shaking. The gel is centrifuged off and weighed, and is then dried at 70° C. until the weight is constant, and is reweighed.

The styrene butadiene rubber starting products are preferably prepared by emulsion polymerization. In this connection see, for example, I. Franta, *Elastomers and Rubber Compounding Materials*, Elsevier, Amsterdam 1989, Pages 88 to 92.

The styrene butadiene rubber gels are intended to include microgels which are prepared by cross-linking styrene butadiene copolymer which contain from 1 to 80 percent by weight styrene and 99 to 20 percent by weight butadiene. Preferably from 5 to 50 weight percent of the SBR is derived from styrene and the balance being derived from butadiene.

The cross-linking of the rubber starting products to form styrene butadiene rubber gels takes place in the latex state. This may be during polymerization, as a result of continuing the polymerization to high conversions, or in the monomer feeding process as a result of polymerization at high internal conversions, or as a result of post-cross-linking after polymerization, or both processes may be combined. The rubber starting products may also be prepared by polymerization in the absence of regulators.

The styrene butadiene rubber and polybutadiene rubber may also be cross-linked by copolymerization with multifunctional compounds having a cross-linking action. Preferred multifunctional comonomers are compounds having at least two, preferably 2 to 4, copolymerizable C=C double bonds, such as diisopropenylbenzene, divinylbenzene, divinylether, divinylsulphone, diallyl phthalate, triallyl cyanurate, triallyl isocyanurate, 1,2-polybutadiene, N,N'-m-phenylene maleic imide and/or triallyl trimellitate. The following are furthermore considered: acrylates and methacrylates of polyvalent, preferably divalent to tetravalent, $C_2$-$C_{10}$ alcohols, such as ethylene glycol, propanediol-1,2, butanediol, hexanediol, polyethylene glycol, having 2 to 20, preferably 2 to 8 oxyethylene units, neopentyl glycol, bisphenol A, glycerol, trimethylol propane, pentaerythritol, sorbitol and unsaturated polyesters prepared from aliphatic diols and polyols and maleic acid, fumaric acid and/or itaconic acid.

The styrene butadiene rubbers, as well as the natural rubber, polybutadiene rubber, NBR and chloroprene rubber, may also be cross-linked in the latex form to form rubbers gels, as a result of post-cross-linking them with chemicals having a cross-linking action. Suitable chemicals having a cross-linking action are, for example, organic peroxides, for example, dicumyl peroxide, t-butylcumyl peroxide, bis-(t-butyl-peroxyisopropyl)benzene, di-t-butyl peroxide, dibenzoyl peroxide, bis-(2,4-dichlorobenzoyl) peroxide, t-butyl perbenzoate, and organic azo compounds such as azo-bis-isobutyronitrile and azo-bis-cyclohexanenitrile, and dimercapto and polymercapto compounds such as dimercaptoethane, 1,6-dimercaptohexane, 1,3,5-trimercaptotriazine and mercapto-terminating polysulphide rubbers such as mercapto-terminating reaction products of bis-chloroethyl formal with sodium polysulphide. The optimal temperature for the post-cross-linking operation is naturally dependent on the reactivity of the cross-linking agent and may be from room temperature up to approximately 170° C., optionally at elevated pressure. See in this context Houben-Weyl, *Methoden der organischen Chemic [Methods in Organic Chemistry]*, 4$^{th}$ Edition, Volume 14/2, Page 848. Peroxides are particularly preferred cross-linking agents.

It is also optionally possible to enlarge the particles by agglomeration before, during, or after the post-cross-linking in latex form.

Styrene butadiene rubbers, as well as the other rubbers which have been prepared in organic solvents, may also serve as starting products for the preparation of the respective rubber gels. In this case, it is advisable to emulsify the rubber solution in water, optionally with the aid of an emulsifying agent, and to follow this, either before or after removing the organic solvent, with cross-linking of the emulsion thus obtained using suitable cross-linking agents. The cross-linking agents previously named are suitable cross-linking agents.

The polybutadiene gel may be produced by emulsion polymerization (see, for example, M. Morton, P. P. Salatiello, H. Landfield, *J. Polymer Science* 8, 2 (1952), Pages 215 through 224; P. A. Weerts, J. L. M. van der Loos, A. L. German, Makromol. Chem. 190 (1989), Pages 777 through 788). These references are incorporated by reference in their entirety.

The size of the latex particles (DVN value according to DIN 53 2016) is preferably 30 to 500 nm.

Production by polymerization in the absence of regulators is also possible.

In one embodiment, the rubber gel has a glass transition temperature Tg ranging from –80° C. to –10° C.

The rubber sidewall contains a rubber containing olefinic unsaturation. The phrase "rubber or elastomer containing olefinic unsaturation" is intended to include both natural rubber and its various raw and reclaim forms as well as various synthetic rubbers. In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art. In one aspect, the rubber may be a blend of at least two diene based rubbers. In one embodiment, a combination of natural rubber and cis 1,4-polybutadiene rubber is used.

In one embodiment, the sidewall component comprises from 30 to 80 phr of natural rubber and from 20 to 70 phr of cis 1,4 polybutadiene rubber. In another embodiment, the sidewall component comprises from 40 to 70 phr of natural rubber and from 30 to 60 phr of cis 1,4 polybutadiene rubber.

The cis 1,4-polybutadiene rubber (BR) can be prepared, for example, by organic solution polymerization of 1,3-butadiene. The BR may be conveniently characterized, for example, by having at least a 90 percent cis 1,4-content. The cis 1,4-polybutadiene for use in this invention preferably has a cis 1,4-content in a range of about 95 to about 99 percent and a Tg in a range of about –100° C. to about –106° C.

The natural rubber for use in this invention is a cis 1,4-polyisoprene rubber typically having a cis 1,4-content in a range of about 95 to about 100 percent and a Tg in a range of about –65 to about –70° C.

In one aspect of the invention, a relative immiscibility of the cis 1,4-polybutadiene rubber phase in the natural rubber phase is relied upon to contribute a resistance to cut/crack growth propagation for the sidewall composition. The relative immiscibility is primarily a result of a wide disparity of the glass transition temperatures (Tg's), namely differing by at least 30° C., of the cis 1,4-polybutadiene rubber (e.g.: about –100° C. to about –106° C.) and the natural rubber (e.g.: about –65° C. to about –70° C.).

In order to enhance such disparity of Tg's for the elastomers of the sidewall rubber composition, it is preferred that the sidewall rubber composition is exclusive of elastomer(s) with Tg's intermediate (between) the aforesaid Tg's of said natural rubber and cis 1,4-polybutadiene rubber, namely elastomers having a Tg in a range of about –70° C. and about –100° C.

The term "Tg" relates to a glass transition temperature of an elastomer, normally determined by a differential scanning (DSC) calorimeter with a temperature rise of 10° C. per minute.

The term "phr" as used herein, and according to conventional practice, refers to "parts by weight of a respective material per 100 parts by weight of rubber, or elastomer."

In addition to the rubber containing olefinic unsaturation in the rubber sidewall of the tire, silica is present. The amount of silica may range from 5 to 120 phr. Preferably, the silica is present in an amount ranging from 10 to 100 phr. Alternatively, the silica is present is an amount ranging from about 30 to about 60 phr.

The commonly-employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhone-Poulenc, with, for example, designations of Z1165 MP and Z165GR and silicas available from Degussa AG with, for example, designations VN2 and VN3, etc.

Commonly employed carbon blacks can be used as a conventional filler in an amount ranging from 0 to 60 phr. In one embodiment, from 10 to 50 phr of carbon black is used. Representative examples of such carbon blacks include N110, N115, N121, N134, N220, N231, N234, N242, N293, N299, S315, N326, N330, M332, N339, N343, N347, N351, N358, N375, N539, N550, N582, N630, N642, N650, N660, N683, N754, N762, N765, N774, N787, N907, N908, N990 and N991. These carbon blacks have iodine absorptions ranging from 9 to 170 g/kg and DBP No. ranging from 34 to 150 cm³/100 g.

In one embodiment the rubber sidewall may contain a conventional sulfur containing organosilicon compound. Examples of suitable sulfur containing organosilicon compounds are of the formula:

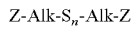

in which Z is selected from the group consisting of

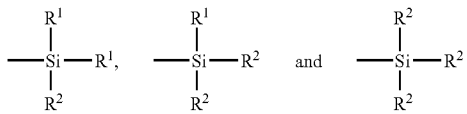

where $R^1$ is an alkyl group of 1 to 4 carbon atoms, cyclohexyl or phenyl; $R^2$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

In one embodiment, the sulfur containing organosilicon compounds are the 3,3'-bis(trimethoxy or triethoxy silylpropyl)polysulfides. In one embodiment, the sulfur containing organosilicon compounds are 3,3'-bis(triethoxysilylpropyl) disulfide and/or 3,3'-bis(triethoxysilylpropyl)tetrasulfide. Therefore, as to formula I, Z may be

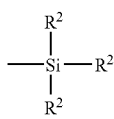

where $R^2$ is an alkoxy of 2 to 4 carbon atoms, alternatively 2 carbon atoms; alk is a divalent hydrocarbon of 2 to 4 carbon atoms, alternatively with 3 carbon atoms; and n is an integer of from 2 to 5, alternatively 2 or 4.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from GE Silicones.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound in a rubber composition will vary depending on the level of other additives that are used. Generally speaking, the amount of the compound will range from 0.5 to 20 phr. In one embodiment, the amount will range from 1 to 10 phr.

It is readily understood by those having skill in the art that the rubber sidewall would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur-vulcanizing agent is elemental sulfur. The sulfur-vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 70 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The rubber sidewall composition may also include up to 70 phr of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, vegetable oils, and low PCA oils, such as MES, TDAE, SRAE and heavy naphthenic oils. Suitable low PCA oils include those having a polycyclic aromatic content of less than 3 percent by weight as determined by the IP346 method. Procedures for the IP346 method may be found in *Standard Methods for Analysis & Testing of Petroleum and Related*

Products and British Standard 2000 Parts, 2003, 62nd edition, published by the Institute of Petroleum, United Kingdom.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber sidewall composition can be accomplished by methods known to those having skill in the rubber mixing art. For example the ingredients are typically mixed in at least two stages, namely at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and compound is mixed in one or more non-productive mix stages. The terms "non-productive" and "productive" mix stages are well known to those having skill in the rubber mixing art. If the rubber composition contains a sulfur containing organosilicon compound, one may subject the rubber composition to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The rubber composition is incorporated in the sidewall of the tire.

The pneumatic tire of the present invention may be a passenger tire, motorcycle tire, aircraft tire, agricultural, earthmover, off-the-road, truck tire and the like. The term "truck tire" includes light truck, medium truck and heavy truck. Preferably, the tire is a light truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air.

In one embodiment, the rubber sidewall is used in a tire having a puncture resistant sidewall as disclosed in co-pending U.S. patent application Ser. No. 11/212,524, fully incorporated herein by reference in its entirety. As disclosed in Ser. No. 11/212,524, the rubber sidewall is comprised of, based upon parts by weight per 100 parts by weight rubber (phr):

(A) an outer, visible annular configured sidewall rubber layer which comprise the hereinbefore mentioned rubber sidewall composition comprising natural rubber, cis 1,4 polybutadiene, silica, and rubber gel; and (B) an inner (non-visible) annular configured sidewall rubber layer integral with and underlying said outer sidewall layer which comprises, based upon parts by weight per 100 parts by weight rubber (phr):

(1) conjugated diene-based elastomers comprised of:
  (a) about 40 to about 80, preferably from about 45 to about 70, phr of cis 1,4-polyisoprene rubber, preferably natural rubber,
  (b) about 20 to about 60, preferably from about 30 to about 55, phr of cis 1,4-polybutadiene rubber,
  (c) optionally from zero to about 30, alternately from about 5 to about 20, phr of styrene/butadiene copolymer rubber;

(2) about 55 to about 80 phr of reinforcing filler as:
  (a) about 5 to about 40 phr of rubber reinforcing carbon black having an Iodine value (ASTM D1510) in a range of from about 30 to about 90 g/kg and a dibutylphthalate (DBP) value (ASTM D2414) value in a range of from about 70 to about 130 cc/100 g, and
  (b) about 10 to about 70 phr of synthetic amorphous precipitated silica, (wherein the weight ratio of said precipitated silica to said rubber reinforcing carbon black is preferably in a range of from about 0.8/1 to about 1.5/1);

(3) a coupling agent for said precipitated silica having a moiety reactive with hydroxyl groups (e.g. silanol groups) contained on said precipitated silica and another moiety interactive with said conjugated diene-based elastomers, and (4) a dispersion therein of short fibers in a range of about 1 to about 12 phr thereof, wherein said short fibers are preferably comprised of at least one of aramid and nylon filaments, preferably at least one aramid filament.

wherein said short fibers are substantially aligned in a parallel relationship to each other and substantially parallel to said annular configuration of said inner sidewall rubber layer.

The short fibers may have an average length, for example, of less than 0.5 millimeters (mm).

In one embodiment, the inner layer of the oriented fiber reinforced rubber is underlying and integral with (in a sense of being co-cured with in a suitable tire mold) the outer, visible rubber sidewall layer to enhance the tire sidewall's penetration resistance (e.g. puncture resistance by an impacting foreign object).

In another embodiment, the tire is comprised of a carcass which contains a rubber carcass ply comprised of a rubber encapsulated cord reinforcement of a plurality of cords wherein said cords are positioned in a radially disposed (the cords extend in a radial direction outward from the bead portion of the tire to its circumferential tread), spaced apart substantially parallel relationship to each other, wherein the rubber carcass ply is integral with and underlies the inner rubber sidewall layer and wherein the short fibers of the inner rubber sidewall layer are substantially aligned in a perpendicular direction to the cords of said underlying carcass ply.

In another embodiment, the short fibers in the rubber layer are positioned within the tire sidewall which overlies a tire carcass ply in a manner that the oriented short fibers are as a right angle (90 degree angle) to the direction of the carcass ply cord in a manner that further enhances the tire sidewall's penetration resistance (e.g. puncture resistance by an impacting foreign object).

The invention is further illustrated by the following non-limiting example.

EXAMPLE 1

In this Example, a rubber gel and silica were evaluated in a rubber sidewall composition. Rubber compositions containing the materials set out in Table 1 was prepared using three separate stages of addition (mixing); namely two non-productive mix stages and one productive mix stage. The non-productive stages were mixed for two minutes at a rubber temperature of 160° C. The drop temperature for the productive mix stage was 115° C.

The rubber compositions are identified as Sample 1 through Sample 4. Table 2 illustrates the physical properties of the cured Samples 1 through 4. The Samples were cured at the indication conditions.

TABLE 1

| | Samples | | | |
|---|---|---|---|---|
| | 1 | 2 | 3 | 4 |
| First Non-Productive Mix | | | | |
| Cis-1,4 polybutadiene[1] | 65 | 65 | 50 | 50 |
| Natural Rubber | 35 | 35 | 50 | 50 |
| Silica[2] | 0 | 0 | 30 | 30 |
| Carbon Black[3] | 50 | 50 | 33 | 33 |
| Process Oil | 12 | 12 | 0 | 0 |
| Coupling Agent[4] | 0 | 0 | 2.5 | 2.5 |
| Wax | 3 | 3 | 1.5 | 1.5 |
| Zinc Oxide | 2 | 2 | 0 | 0 |
| Stearic Acid | 1 | 1 | 3 | 3 |
| Antidegradant[5] | 4.25 | 4.25 | 4 | 4 |
| BR Gel[6] | 0 | 10 | 0 | 10 |
| Productive Mix | | | | |
| Zinc Oxide | 1 | 1 | 3 | 3 |
| Sulfur | 1.9 | 1.9 | 1.25 | 1.25 |
| Accelerators[7] | 0.6 | 0.6 | 1.1 | 1.1 |

[1]Budene 1207 from The Goodyear Tire & Rubber Company
[2]Precipitated silica from Degusaa as Ultrasil VN2
[3]N550
[4]bis(triethoxysilyl) disulfane
[5]Phenylenediamine type
[6]BR gel, reacted with 1.5 phr of trimethylolpropane trimethacrylate (TMPTMA), with an average diameter of 50 nm, $T_g$ of −75° C., and $Q_i$ = 11.6. Surface treatment 7.5 percent hydroxyethyl methacrylate (HEMA).
[7]sulfenamide type

TABLE 2

| | Samples | | | |
|---|---|---|---|---|
| | 1 | 2 | 3 | 4 |
| Rheometer-MDR 2000 at 150° C. | | | | |
| Amount S', dN-m | 7.9 | 7 | 14.3 | 13.5 |
| T25, minutes | 8.2 | 8.9 | 7 | 7.1 |
| T90, minutes | 15.4 | 16.6 | 14.3 | 14.1 |

TABLE 2-continued

| | Samples | | | |
|---|---|---|---|---|
| | 1 | 2 | 3 | 4 |
| Goodrich Flex (Cured 10 minutes at 170°) | | | | |
| Static Compression, % | 37.5 | 40.6 | 22.5 | 22.2 |
| Percent Set | 5.3 | 9 | 2 | 2 |
| Delta T 15, ° C. | 41.9 | 50.5 | 31.6 | 31.2 |
| Ring Modulus at 23° C. (Cured 14 minutes at 160° C.) | | | | |
| Elongation at Break, % | 759 | 744 | 542 | 535 |
| Specific Energy, MPa | 35.7 | 29.3 | 34.7 | 35.8 |
| Modulus Ratio | 4.1 | 3.8 | 4.6 | 4.8 |
| True Tensile | 107.2 | 90.5 | 101 | 104.9 |
| 100% Modulus, MPa | 0.9 | 0.8 | 1.9 | 2 |
| 200% Modulus, MPa | 1.9 | 1.6 | 4.9 | 5.2 |
| 300% Modulus, MPa | 3.7 | 3.1 | 8.9 | 9.4 |
| 500% Modulus, MPa | 8.3 | 7.1 | 16.2 | 17.1 |
| Specific Gravity, g/cm³ | 1.105 | 1.095 | 1.16 | 1.144 |
| Tensile Strength, MPa | 12.5 | 10.7 | 15.7 | 16.5 |
| Rebound (Cured 14 minutes at 160° C.) | | | | |
| Rebound at 23° C., % | 57.1 | 55.5 | 56.1 | 58.7 |
| Rebound at 100° C., % | 64.6 | 61.8 | 69.2 | 71.2 |
| Hardness (Cured 14 minutes at 160° C.) | | | | |
| Shore A at 23° C. | 46.1 | 43.6 | 62 | 60.6 |
| Shore A at 100° C. | 45 | 42.4 | 58.7 | 58 |
| Goodrich Blowout (cured 10 minutes at 170° C.) | | | | |
| Static Compression, % | — | — | 32 | 30.4 |
| Initial Dynamic Compression, % | — | — | 19.5 | 18.9 |
| Final Dynamic Compression, % | — | — | 6.3 | 5.4 |
| Time, minutes | — | — | 6.3 | 5.4 |
| Temperature Rise, ° C. | — | — | 47 | 40 |
| Rotary Drum Abrasion (cured 14 minutes at 160° C.) | | | | |
| Average abrasion loss, mm³ | 90.3 | 97.3 | 52.3 | 47.7 |

It can be seen from Table 2 that substantial improvements in rebound, 300 percent modulus and abrasion are seen for the inventive sample 4 containing both silica and gel as compared with the controls. In particular, such improvements are not observed for sample 2 containing carbon black and gel, but no silica. Such behavior is unexpected and surprising. Improvement in rebound is correlated with reduced hysteresis loss, indicative of improved rolling resistance. Improved 300% modulus is correlated with improved sidewall performance, and improved abrasion resistance is desirable for improved sidewall durability.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a rubber sidewall comprised of
(i) an outer, visible annular configured sidewall rubber layer which comprises
  (A) 30 to 80 phr of natural rubber;
  (B) 20 to 70 phr of cis 1,4-polybutadiene rubber;
  (C) from 10 to 100 phr of silica; and
  (D) from 1 to 30 phr of a particulate rubber gel filler selected from the group consisting of polybutadiene gel, styrene butadiene gel, acrylonitrile-butadiene gel, chloroprene gel, natural rubber gel, and mixtures thereof; and (ii) an inner annular configured sidewall rubber layer integral with and underlying said outer sidewall layer which comprises, based upon parts by weight per 100 parts by weight rubber (phr):
  (1) conjugated diene-based elastomers comprised of:
    (a) about 40 to about 80 phr of cis 1,4-polyisoprene rubber,
    (b) about 20 to about 60 phr of cis 1,4-polybutadiene rubber,
    (c) from zero to about 30 phr of styrene/butadiene copolymer rubber;
  (2) about 55 to about 80 phr of reinforcing filler as:
    (a) about 5 to about 40 phr of rubber reinforcing carbon black having an Iodine value in a range of from about 30 to about 90 g/kg and a dibutylphthalate (DBP) value in a range of from about 70 to about 130 cc/100 g, and
    (b) about 15 to about 70 phr of synthetic amorphous precipitated silica,
  (3) a coupling agent for said precipitated silica having a moiety reactive with hydroxyl groups contained on said precipitated silica and another moiety interactive with said conjugated diene-based elastomers, and
  (4) a dispersion therein of short fibers in a range of about 1 to about 12 phr thereof, wherein said short fibers have an average length of less than 0.5 millimeters (mm) and are comprised of at least one of aramid and nylon filaments;

wherein said short fibers are substantially aligned in a parallel relationship to each other and substantially parallel to said annular configured inner sidewall rubber layer, and wherein said tire further is comprised of a carcass which contains a rubber carcass ply comprised of a rubber encapsulated cord reinforcement of a plurality of cords, wherein said cords extend in a radial direction outward from a bead portion of the tire to its circumferential tread, wherein said cords are spaced apart in a substantially parallel relationship to each other, wherein said rubber carcass ply is integral with and underlies said inner rubber sidewall layer and wherein said short fibers of said inner rubber sidewall layer are substantially aligned in a perpendicular direction to said cords of said underlying carcass ply.

2. The pneumatic tire of claim 1, where the outer sidewall rubber layer further comprises from 10 to 50 phr of carbon black.

3. The pneumatic tire of claim 1 wherein said rubber gel is polybutadiene gel.

4. The pneumatic tire of claim 1 wherein said rubber gel is a styrene butadiene gel.

5. The pneumatic tire of claim 1 wherein said rubber gel is grafted with a polar unsaturated monomer.

6. The pneumatic tire of claim 5 wherein said polar unsaturated monomer is selected from the group consisting of acrylic acid, methacrylic acid, acrylamide, methacrylamide, N-methoxymethyl methacrylic acid amide, N-acetoxxymethyl methacrylic acid amide, acrylonitrile, dimethyl acrylamide, hydroxyethyl acrylate, hydroxyethyl methacrylate, hydroxypropyl acrylate, hydroxypropyl methacrylate, hydroxybutyl acrylate, hydroxybutyl methacrylate.

7. The pneumatic tire of claim 5 wherein from 1 to 20 weight percent of said rubber gel is derived from said polar unsaturated monomer.

8. The pneumatic tire of claim 1 wherein from 0.5 to 20 phr of a sulfur containing organosilicon compound is present in the outer sidewall rubber layer and is of the formula:

$$Z\text{-Alk-}S_{n}\text{-Alk-}Z$$

in which Z is selected from the group consisting of $$-\underset{\underset{R^2}{|}}{\overset{\overset{R^1}{|}}{Si}}-R^1, \quad -\underset{\underset{R^2}{|}}{\overset{\overset{R^1}{|}}{Si}}-R^2 \quad \text{and} \quad -\underset{\underset{R^2}{|}}{\overset{\overset{R^2}{|}}{Si}}-R^2$$

where $R^5$ is an alkyl group of 1 to 4 carbon atoms, cyclohexyl or phenyl; $R^6$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

9. The pneumatic tire of claim 1 wherein said composition of the outer sidewall rubber layer is thermomechanically mixed at a rubber temperature in a range of from 140° C. to 190° C. for a total mixing time of from 1 to 20 minutes.

10. The pneumatic tire of claim 1 wherein said tire is selected from the group consisting of passenger tires, motorcycle tires, aircraft tires, agricultural, earthmover, off-the-road and truck tires.

11. The pneumatic tire of claim 1 wherein said rubber gel has a particle diameter of from 20 to 1,000 nm.

12. The pneumatic tire of claim 1 wherein said rubber gel has a swelling index (Qi) in toluene of from 1 to 15.

13. The pneumatic tire of claim 1 wherein the rubber gel has a Tg in a range from −80° C. to +10° C.

* * * * *